United States Patent
Custer

[15] 3,650,497
[45] Mar. 21, 1972

[54] JET PROPELLED CHANNELED AIRCRAFT

[72] Inventor: Willard R. Custer, Hagerstown, Md.

[73] Assignee: Custer Channel Wing Corporation, Hagerstown, Md.

[22] Filed: Nov. 26, 1969

[21] Appl. No.: 880,011

[52] U.S. Cl. ..........................244/12 CW, 244/52, 244/90 R
[51] Int. Cl. ..........................................................B64c 9/06
[58] Field of Search .......................................244/12, 52, 90

[56] References Cited

UNITED STATES PATENTS

| | | | |
|---|---|---|---|
| 3,341,153 | 9/1967 | Fatouras | 244/52 |
| 2,665,083 | 1/1954 | Custer | 244/12 |
| 2,765,993 | 10/1956 | Custer | 244/52 |
| 2,937,823 | 5/1960 | Fletcher | 244/12 |
| 3,029,044 | 4/1962 | Childress | 244/12 |

Primary Examiner—Milton Buchler
Assistant Examiner—Steven W. Weinrieb
Attorney—Raphael Semmes

[57] ABSTRACT

Jet propelled aircraft having lift enhancing channels connected to the jet engines or nacelles for the same either directly or contiguously, for close proximity with fluid flow associated with the engines, and with structural refinement. The channels can have airfoil shaped sections to increase lift and efficiency. The channels can be incorporated forward and/or aft of the engines, and aft channels can be adjustably controlled.

4 Claims, 8 Drawing Figures

INVENTOR
WILLARD R. CUSTER

BY Raphael Semmes
ATTORNEY

INVENTOR
WILLARD R. CUSTER

BY Raphael Semmes
ATTORNEY

3,650,497

JET PROPELLED CHANNELED AIRCRAFT

BACKGROUND OF THE INVENTION

A number of my prior patents, such as U.S. Pat. Nos. 2,611,555, 2,665,083, 2,721,045, and 2,687,262, for example, describe varied structures of aircraft having channel wings, and channels associated with jet engine aircraft, in different arrangements and combinations. The channels, as described in the prior patents, provide lifting potential when in flight, combined with high lift at low speeds during takeoff and landing.

The channels which are disposed in the direction of flight form airfoils, and a blast of fluid flowing through the channels induces a lifting force which is a function of the difference in speeds of the air and gases in the channels and the air beneath the channels. The lifting force is greatest when the aircraft is not moving or moving at low speeds when lift is needed most.

SUMMARY OF THE INVENTION

The present invention has as its principal feature improvements in design and operation of constructions such as set forth in my prior patents. The placement of the channels in close proximity to the jet engine, either directly connected thereto, formed as a part thereof, or connected to engine nacelles, increases the lifting potential derived from the fluid flow. These arrangements also result in structural simplicity and strength. Use of an airfoiled section in the channel gives a further increase of lift and efficiency over flat channels. Dependent upon structure and operational requirements, the channels can be incorporated forward of and aft of the engines, or in combinations. Controllability of aft channels provides greater control of aircraft operations.

Other and additional objects and advantages of the invention will be more readily apparent from the following descriptions of illustrative embodiments when taken with the accompanying drawings, in which.

Figure 1:
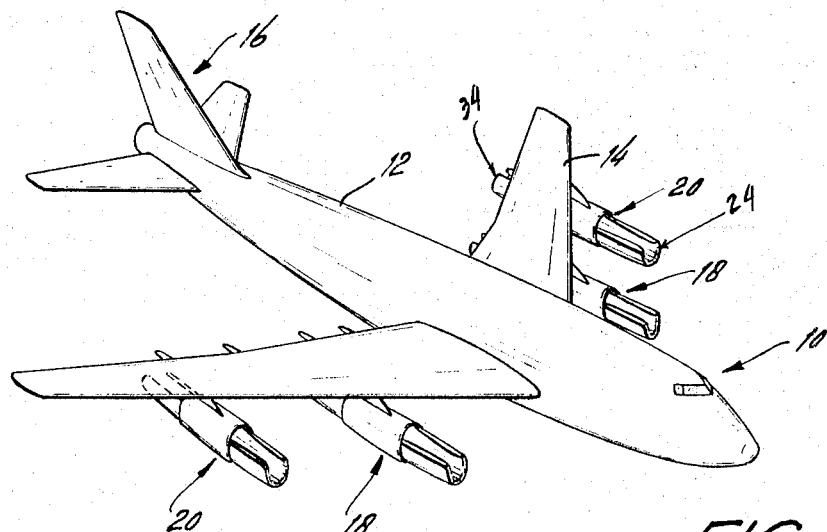
FIG. 1 is a perspective view of an aircraft incorporating my invention.

Referring in more detail to the drawings wherein like references refer to like parts, an airplane, generally designated 10, includes the usual fuselage 12, wings 14, empennage 16, and generally, inboard jet engines 18 and outboard jet engines 20. Such structure is standard and forms no part of this invention but is for an illustrative setting only.

Figure 2:
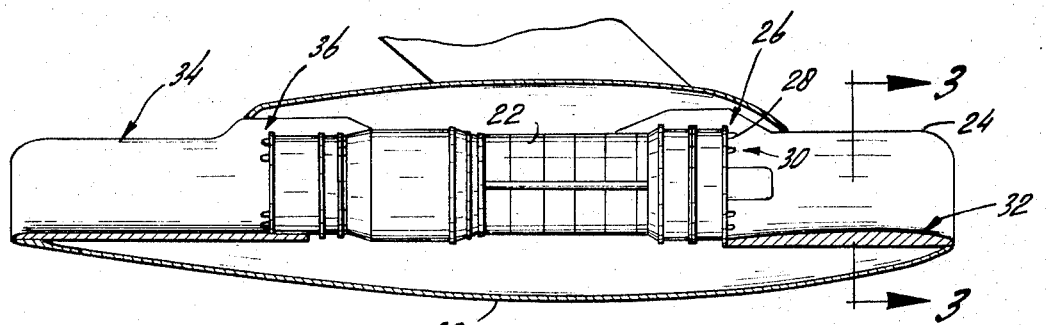
FIG. 2 is a partial sectional view in elevation of a jet engine and channel therewith.
Figure 3:
FIG. 3 is a sectional view taken on line 3—3 of FIG. 2.

The present invention is applicable to aircraft wherein the jet engine is below the wing. FIGS. 1 and 2 show a construction wherein a jet engine, per se 22, is shown, attached to an airplane in any acceptable manner. A forward channel 24 is formed as a part of the engine or attached thereto such, for example, as mating bulkheads, flanges or rings 26 and bolts 28. Other means can be used but the channel is closely proximated or juxtaposed to the engine intake end 30. The channel 24 is preferably, although not necessarily, of airfoil shape in section to give increased lift, as indicated generally at 32. An aft channel 34 is shown in FIGS. 1 and 2 likewise attached to or formed as a part of the engine 22, the attachment being shown generally at 36 and similar to the forward structure. The channel is closely proximated to the discharge end of the engine. When so disposed the channels are most directly and efficiently affected by fluid flow through the engine. A nacelle 38 surrounds the engine in a usual manner, and preferably the nacelle is built around the engine and channel in this embodiment. The configuration of the nacelle is such that the upward open channel can perform its function as set forth in my prior patents.

Figure 4:
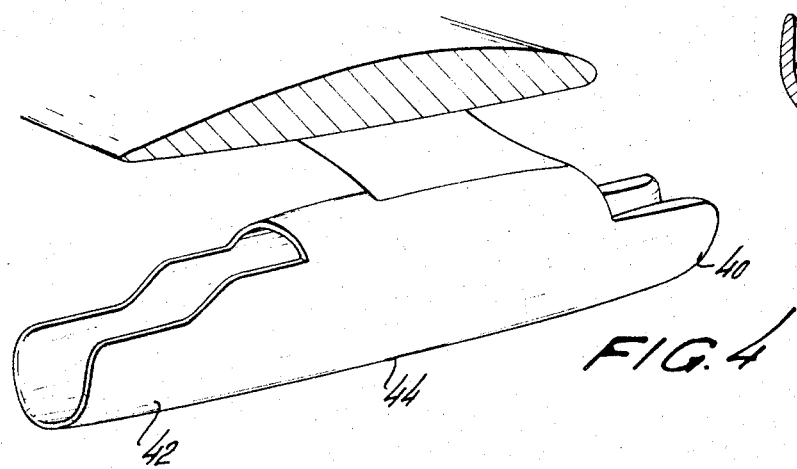
FIG. 4 is a perspective view showing a channel formed with an engine nacelle.
Figure 5:
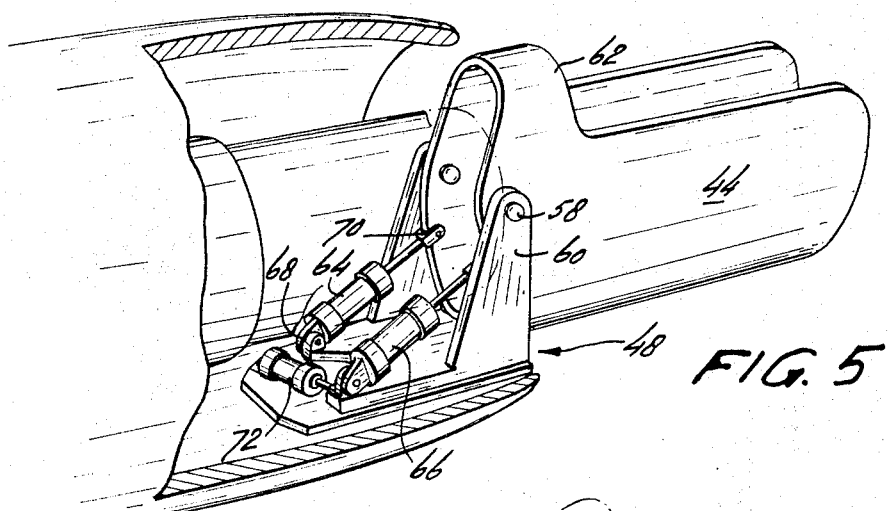
FIG. 5 is a fragmentary perspective view of an aft positioned controllable channel attached to a jet engine and operating means therefor.

A modification of the invention is shown in FIG. 4, wherein a forward channel 40 and aft channel 42 are attached or fixed to nacelle 44, or can be formed as an integral part thereof. The function of this embodiment is the same as that of FIGS. 1 and 2.

While the channels have been shown in both forward and aft dispositions, it is understood that one or the other can be omitted and various combinations can be used to provide desired operational characteristics to the aircraft. Use of airfoiled sections or flat channels also are contemplated for similar reasons. It is also to be understood that the nacelles need not be coextensive with the channels, but that the channels can extend partially or completely beyond the nacelles, as shown, for example, in FIG. 4.

In the foregoing embodiments, the aft channels are fixed or stationary with respect to the engines and nacelles. FIGS. 5–8 disclose a construction in which an aft channel 44 is adjustable up and down and/or toggled sideways. The amount of angular adjustment can, of course, be varied, but in the embodiment shown, the mechanism is designed to afford control between approximately 0° to 45° in the desired directions vertically and horizontally and/or a combination thereof. The positioning, as aforesaid, of the channels, very effectively, in the fluid flow stream, creates, upon angular movement of the channels, a high degree of directional control in the different axes of flight, as well as affording increased lift and/or drag characteristics to aircraft in flight, reference being had to prior U.S. Pat. No. 2,765,993.

Channel 44 in this embodiment is angularly mounted on the engine 46 by means of a stirrup or bifurcated channel-shaped member, generally designated 48, including a bottom plate portion 50 pivotally mounted at 52 on, for example, a block 54 secured to or forming a part of engine 46 or attached to nacelle 56. The channel is pivotally connected at 58 to ears 60 of stirrup 48. In the shown construction the channel 44 includes a ring 62 for structural strength and favorable operating characteristics, but ring 62 can be omitted.

Figure 6:
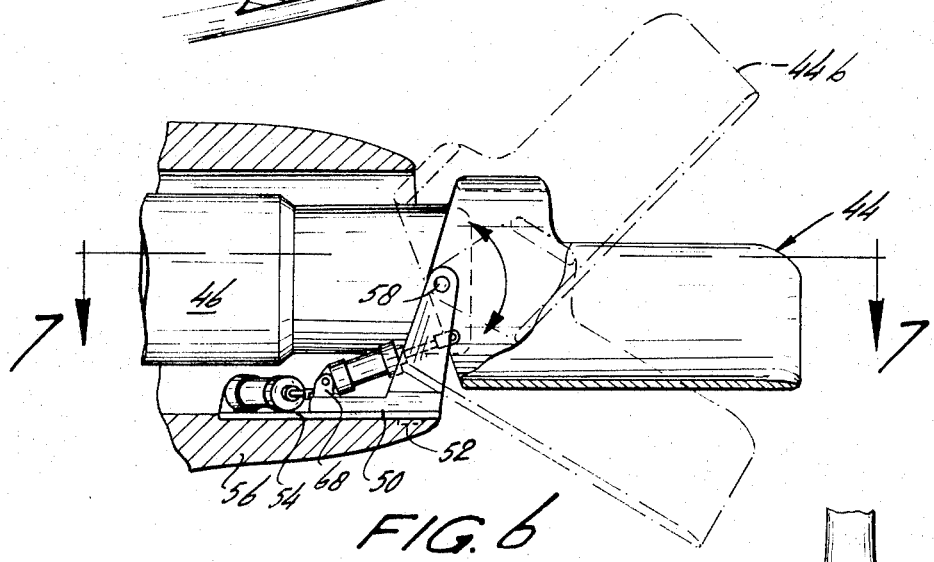
FIG. 6 is a sectional elevational view of the embodiment of FIG. 5.
Figure 7:
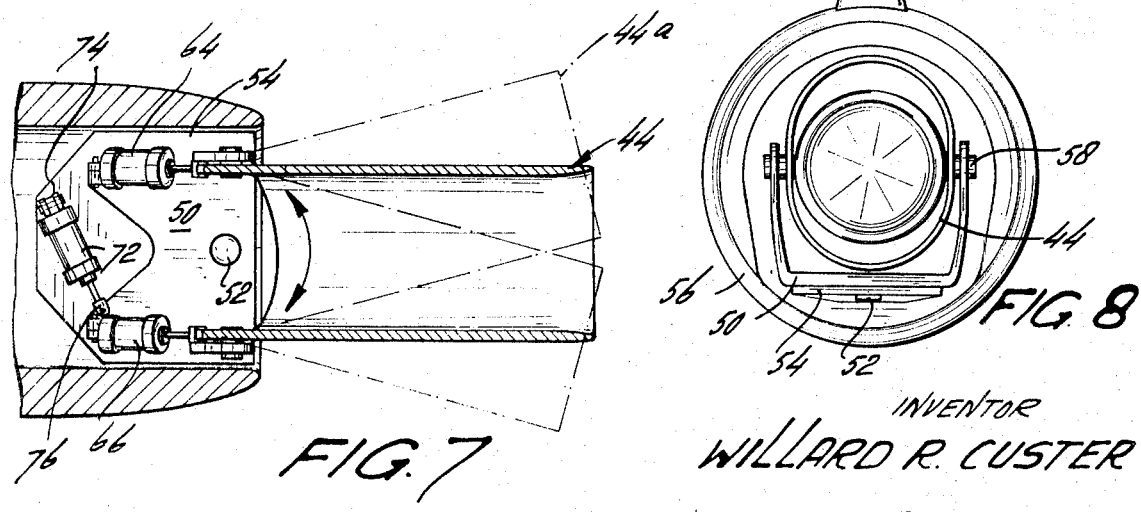
FIG. 7 is a top plan view of the structure of FIG. 6.
Figure 8:
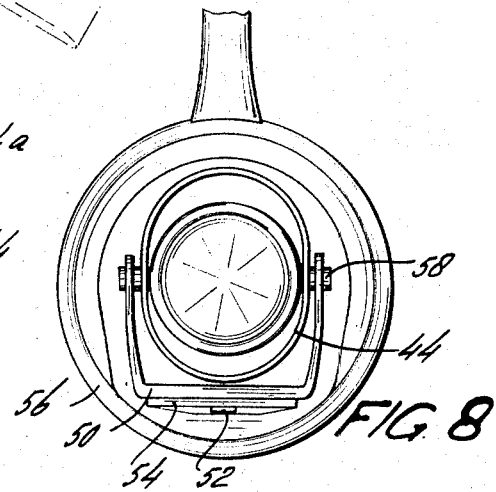
FIG. 8 is a rear elevational view of the structure of FIG. 7.

The dual pivotal mounting permits angular movement of the channel horizontally, as indicated in broken lines at 44a, FIG. 7, and vertically, broken lines 44b, FIG. 6

Mechanism which can be used for channel movement includes pneumatic or hydraulic cylinders 64 and 66 pivotally connected at 68 to plate 50 with their plunger arms pivotally connected at 70 to the channel sides below pivots 58. These cylinders are operable to vertically pivot the channel with respect to stirrup 48 into the broken line positions at 44b. A pneumatic or hydraulic dual operating cylinder 72 is pivotally connected at 74 to block 54, and its plunger end is pivotally connected at 76 to a stirrup side and operable to horizontally pivot the channel into broken line positions 44a. The operating systems, not shown, for the cylinders can be of known designs and form no part of this invention. Obviously other types of control mechanisms such as electrical or mechanical can be used for the channel control.

Aft channels, if used on the outboard engines, can be so oppositely adjustably controlled, if desired, as to replace or work in conjunction with standard ailerons in an obvious manner, and this would create positive and high efficiency lateral control for the aircraft. Control by the rudder and elevators can also be replaced or supplemented by the adjustable channels. It will thus be seen that overall control of the aircraft is greatly enhanced and especially at low operating speeds where the standard controls are least effective.

Use and operation of my invention as disclosed in the shown and described embodiments will be readily apparent to those skilled in the art, and further explanation is not considered necessary herein.

Manifestly, various changes and minor modifications will appear to those skilled in the art to which the invention per-

I claim:

1. In a jet propelled aircraft having a fuselage, wings, and jet engines operatively mounted on said wings on opposite sides of said fuselage in laterally spaced relation thereto, the improvement comprising:
   a. ailerons consisting of an aft upwardly open lift channel affixed to each of said jet engines in close proximity to the discharge end thereof, and in direct line of communication with exhaust flow therefrom;
   b. means mounting said channels with respect to said engines for vertical angular adjustment with respect to said engine and the exhaust flow therefrom; and
   c. means operable to selectively implement the angular adjustment, said channels constituting vertical lift surfaces normal to the longitudinal axis thereof, whereby, through lift created thereby due to exhaust gas flow therethrough, upon angular adjustment, function as ailerons to steer said aircraft at slow speeds.

2. In an aircraft as claimed in claim 1, said jet engines being mounted below said wing in spaced relation thereto.

3. In an aircraft as claimed in claim 2, wherein upwardly open lift channels are stationarily affixed to each of said jet engines in close proximity to the intake end thereof, and in direct line of intake flow thereto.

4. In an aircraft as claimed in claim 3, said aft channels being additionally horizontally angularly adjustable.

* * * * *